(12) United States Patent
Halemba et al.

(10) Patent No.: US 6,428,708 B1
(45) Date of Patent: Aug. 6, 2002

(54) FILTER APPARATUS AND METHOD

(75) Inventors: Peter Halemba, Russell; Stuart Park, Burton, both of OH (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 09/520,235

(22) Filed: Mar. 7, 2000

(51) Int. Cl.⁷ .............................................. B01D 35/00
(52) U.S. Cl. ...................... 210/739; 210/100; 210/444; 210/87
(58) Field of Search .................... 210/87, 100, 444, 210/739

(56) References Cited

U.S. PATENT DOCUMENTS

| | | |
|---|---|---|
| 4,431,533 A | 2/1984 | Wrede |
| 4,555,331 A | 11/1985 | Thornton et al. |
| 4,698,164 A | 10/1987 | Ellis |
| 5,527,451 A | 6/1996 | Hembree et al. |

*Primary Examiner*—Chester T. Barry
(74) *Attorney, Agent, or Firm*—Watts, Hoffmann, Fisher & Heinke, Co.

(57) ABSTRACT

A filtering apparatus including a fluid monitoring head and a replaceable filter cartridge removably fastened to the head. The fluid monitoring head includes a shut off mechanism for interrupting fluid flow through the cartridge when a predetermined quantity of fluid has been treated by the filter. The filter cartridge is releasably coupled to the shutoff mechanism when the filter is installed. The shut off mechanism includes a valve element carried by a shaft that forms part of a driven member forming part of the monitoring head. A biasing element exerts a force on the valve element carrying shaft tending to move the valve to a flow blocking position. The shaft engages a keeper or hold off element threadly retained in the filter cartridge. As the driven member rotates, the keeper element is gradually unthreaded until it separates from the filter cartridge, allowing the force of the biasing element to move the valve member into a flow interrupting position. A pressure relief means in the monitoring head allows for easy removal of the cartridge from the monitoring head.

33 Claims, 4 Drawing Sheets

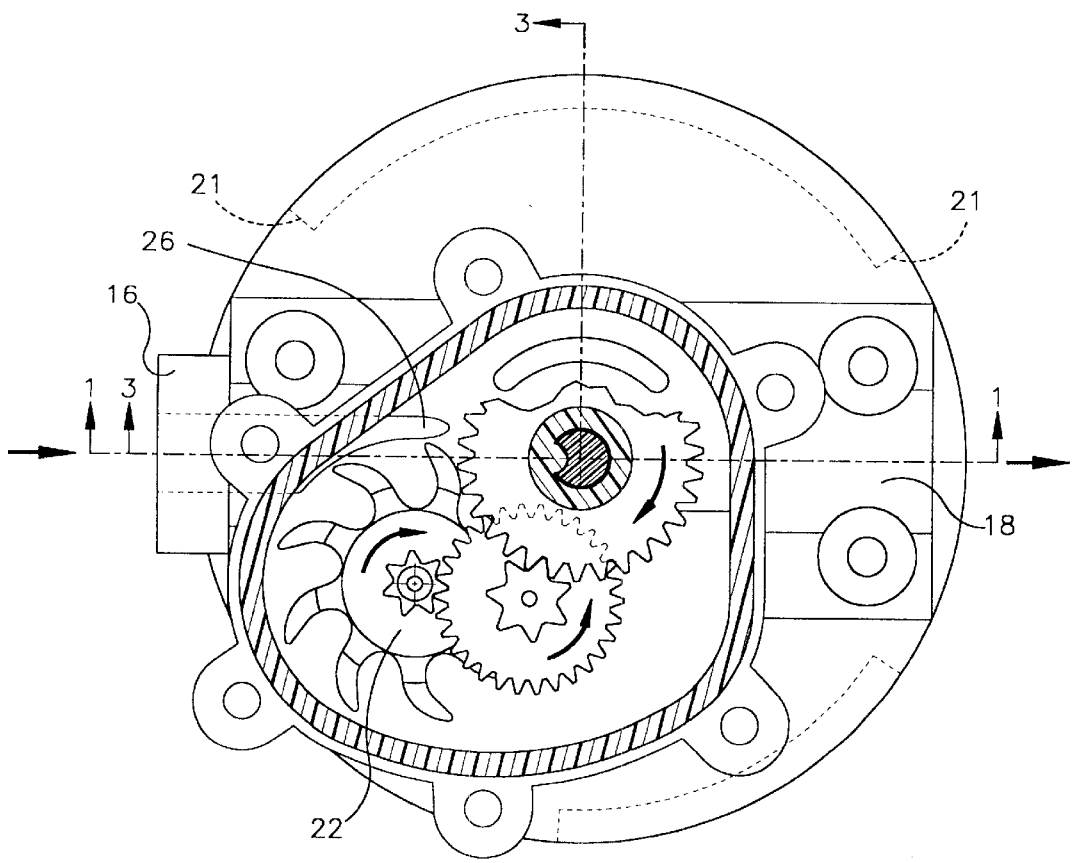
Fig.2
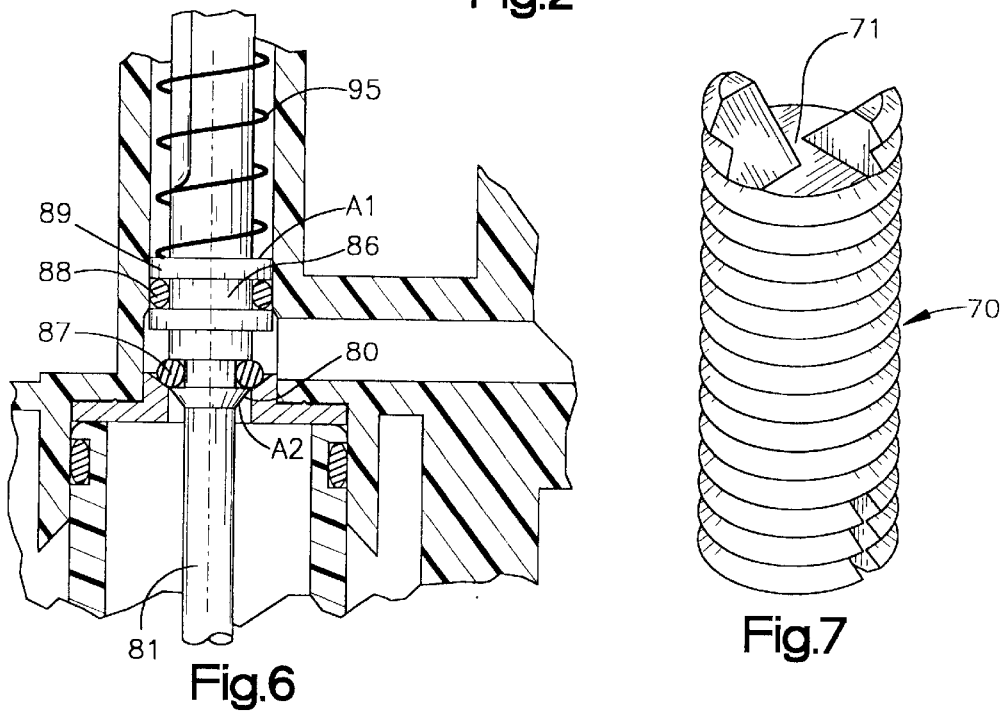
Fig.6
Fig.7

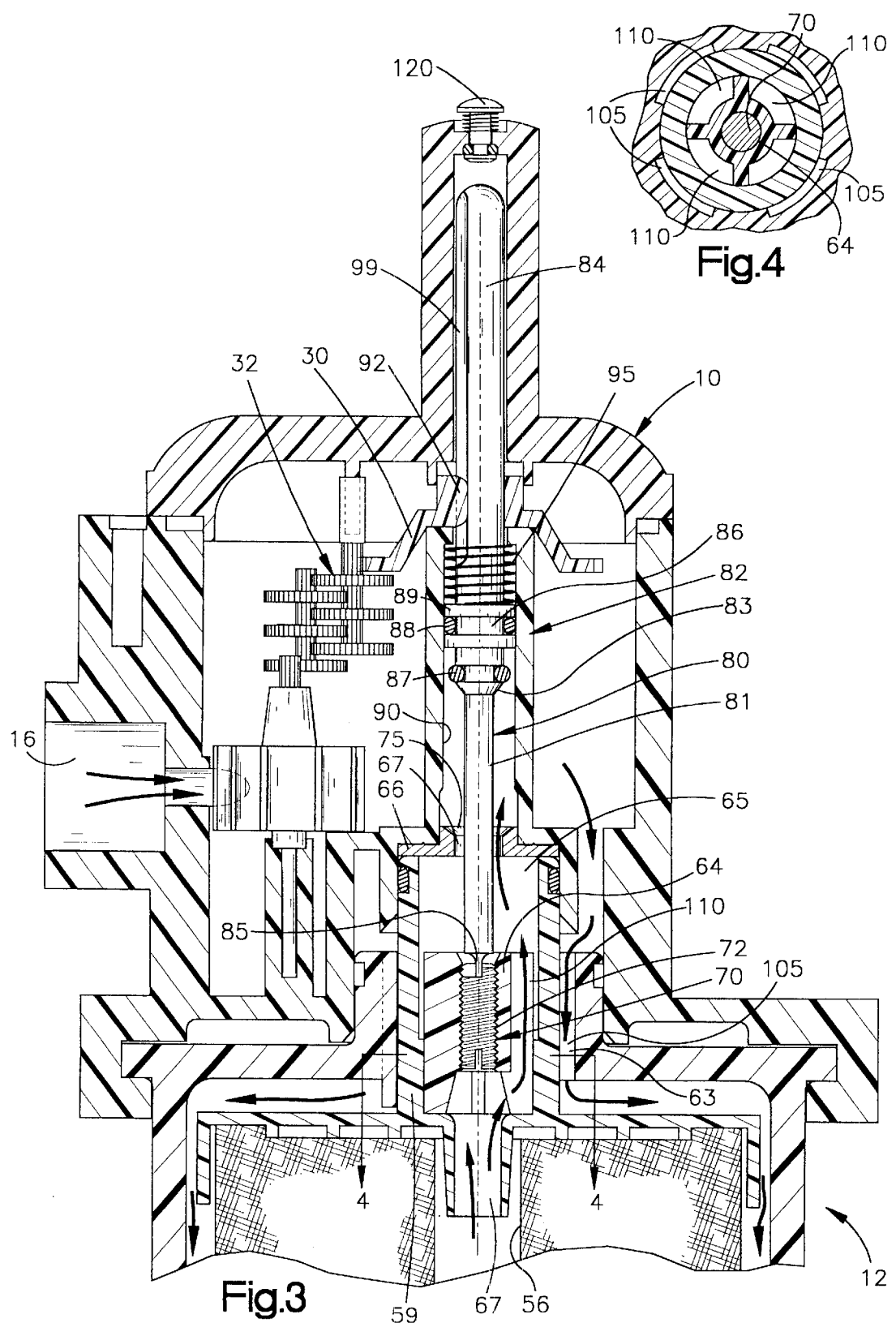

FILTER APPARATUS AND METHOD

TECHNICAL FIELD

The present invention relates generally to filtering systems and in particular to a filtering apparatus that includes a replaceable filter element.

BACKGROUND ART

Filters are used in many applications to remove impurities from a fluid. In the case of water treatment, filters are often employed to selectively remove minerals, chemicals, and other materials. Some of these filters, such as carbon filters which are used to improve the taste and odor of water, gradually become exhausted during use. In particular, the activated carbon housed within the filter eventually becomes saturated and can no longer remove the intended impurities. If the filter is not replaced, the water quality degrades. With many, if not most, of these filters, the user does not recognize the need for replacement until the water quality suffers substantially.

U.S. Pat. No. 4,698,164 to Ellis discloses and claims a filtering apparatus which automatically terminates the flow of water through the filter after a predetermined quantity of water has passed through the filter. By terminating the flow of water automatically, the filtering apparatus prevents the user from consuming water after the water quality has degraded beyond a preset limit, possibly before any noticeable change in taste or odor. The filtering apparatus disclosed in U.S. Pat. No. 4,698,164 contains several relatively expensive components specific to the shutoff feature within the replaceable cartridge. When the cartridge is discarded, these components are lost, increasing the cost of the filter cartridge. The filtering apparatus of the U.S. Pat. No. 4,698,164 terminates the flow of water after a predetermined amount of water has flowed through the filter, but does not give the user an indication of how much life is left in the filter. The filter may therefore shut off flow without warning, causing inconvenience. In addition, remaining pressure build up in the monitoring head after the water is shut off to replace the filter cartridge often made removal of the cartridge difficult. A final drawback to the filtering apparatus of the U.S. Pat. No. 4,698,164 is that is experiences a relatively high pressure drop. Although filters constructed in accordance with the '164 patent performed well and have enjoyed commercial success, it is desirable to enhance its functionality while reducing its manufacturing cost.

DISCLOSURE OF THE INVENTION

The present invention provides a new and improved filtering apparatus that monitors the water flow through a filter element and automatically terminates the flow of water after a predetermined quantity of water has passed through the filter.

The disclosure of the invention is illustrated in connection with water filtered through a carbon filter. However, it should be understood that the invention is adaptable to a wide variety of fluids and filters and should not be limited to water filtered through a carbon filter.

According to the preferred and illustrated embodiment, the filtering apparatus and system comprises a fluid monitoring head and a replaceable filter element. The monitoring head includes a fluid flow sensing mechanism for measuring the quantity of fluid passed through a replaceable filter element and a flow shutoff mechanism releasably connected to a shutoff activating device located in the filter element when the filter is attached to the fluid monitoring head. When the filter is mounted to the head, the flow shutoff mechanism forming part of the fluid monitoring head automatically couples to the shutoff activating device located within the filter element and is reset to an initial position.

In accordance with the invention, the shutoff mechanism includes a shutoff valve element which is moved when the shutoff activating device activates the flow shutoff mechanism to close off the flow path through the fluid monitoring head when a predetermined quantity of water has passed through the filter as measured by the fluid monitoring head. Since, in the preferred embodiment, the filter is intended to be a disposable item, the unit is sealed and access to the shutoff activating device is prevented; consequently the filter must be replaced to reestablish fluid flow through the system.

The preferred fluid sensing mechanism comprises a turbine disposed in the fluid flow path that is operatively connected to a reduction gear train. The gear train in turn is connected to a drive member forming part of the monitoring head which couples with a driven member also forming part of the monitoring head.

In the preferred and illustrated embodiment, the flow through the filter is not reduced as the time for replacement nears. The valve element remains substantially out of the flow path until released by the shutoff mechanism. This feature is achieved in the preferred embodiment, by a driven member that comprises a rotatable stem including structure couplable with the drive member. The rotatable stem (forming part of the fluid monitoring head) is moveable within a valve chamber and includes a tapered end for engaging the shutoff activating device located within the filter element and a life indicating end viewable to the user. The valve element comprises a piston assembly disposed on the stem between the tapered end and the life indicating end. The piston assembly includes an upper portion for engaging a spring disposed around the life indicating end of the stem which has a biasing force tending to move the stem and its piston toward the filter element. A lower portion of the piston is configured to mate with an opening in the fluid monitoring head which is part of the flow path such that when the piston is seated within the opening, fluid cannot flow out of the monitoring head.

The shutoff activating device comprises a pin having a threaded segment threadably received in threaded cavity in the filter element and having a shutoff mechanism engaging end. Relative to the filter element, the shutoff activating pin can move between two positions, an initial position at installation and a valve release position in which the threaded segment has moved through the threaded cavity and is no longer retained therein. Due to their interaction, the position of the activating pin within the threaded cavity controls the height of the stem within the valve chamber. When the pin is at its initial position, the stem is held at a position such that the life indicating end indicates that there is full life available and the piston is at its furthest location from its mating opening in the monitoring head.

When the filter is installed on the monitoring head, the tapered end of the rotatable stem engages the shutoff mechanism engaging end of the shutoff activating pin. The stem is pushed against the biasing force of the spring by the activating pin so that the life indicating pin shows full life and the lower portion of the piston is clear of the opening in the fluid monitoring head. As fluid flows through the monitoring head the turbine rotates. The rotation of the turbine drives the gear train causing the rotatable stem of the shutoff mechanism to rotate. As the stem rotates, the tapered end of the stem interacts with the shutoff engaging end of the shutoff activating pin to thread it in a direction away from the initial position toward the filter element and the valve release position. The stem remains engaged with the activating pin by virtue of the biasing force of the spring. In addition to the biasing force of the spring, a resultant downward force is exerted on the piston by virtue of ambient water pressure acting on a larger area above the piston than below the piston. When the shutoff activating pin reaches the valve release position it falls clear of the threaded cavity to allow the rotatable stem to be moved by the spring to seat the lower end of the piston in the opening in the fluid monitoring head to block the flow of fluid out of the monitoring head.

In accordance with a feature of the invention, the coupling between the monitoring head and the replaceable filter is provided by a thread type structure. The replaceable filter is preferably a molded cartridge supported in a housing which includes molded, internal threads at one end. The monitoring head includes a depending flange defining external threads adapted to receive the threads formed on the housing. With the disclosed construction, replacement of the filter is accomplished quite readily.

According to another feature of the invention, the shutoff mechanism engaging end of the shutoff activating pin comprises a unidirectional configuration such that the pin may only be turned by the tapered end of the stem or other device such as a standard screw driver in a direction which moves the pin within the threaded cavity away from the monitoring head. This feature prevents the user from counter-rotating and/or resetting the pin and continuing to use the filter element after it has exceeded its optimum filtering life. According to another feature the invention, a pressure relief valve is provided to prevent pressure build up in the monitoring head from hindering cartridge removal for replacement.

Additional features of the invention will become apparent and a fuller understanding obtained by reading the following detailed description made in connection with the accompanying drawings.

BRIEF DESCRIPTION OF THE DRAWINGS

FIG. 2 is a top view of the apparatus shown in FIG. 1;

FIG. 3 is an enlarged fragmentary view of the apparatus shown in FIG. 1 in a fluid flow allowing mode;

FIG. 4 is an enlarged top view of the apparatus shown in FIG. 1;

FIG. 6 is an enlarged fragmentary view of the apparatus shown in FIG. 1 in a fluid flow interrupting mode; and FIG. 7 is a perspective view of a shutoff activating device in accordance with the preferred embodiment of the invention.

BEST MODE FOR CARRYING OUT THE INVENTION

Figure 1:
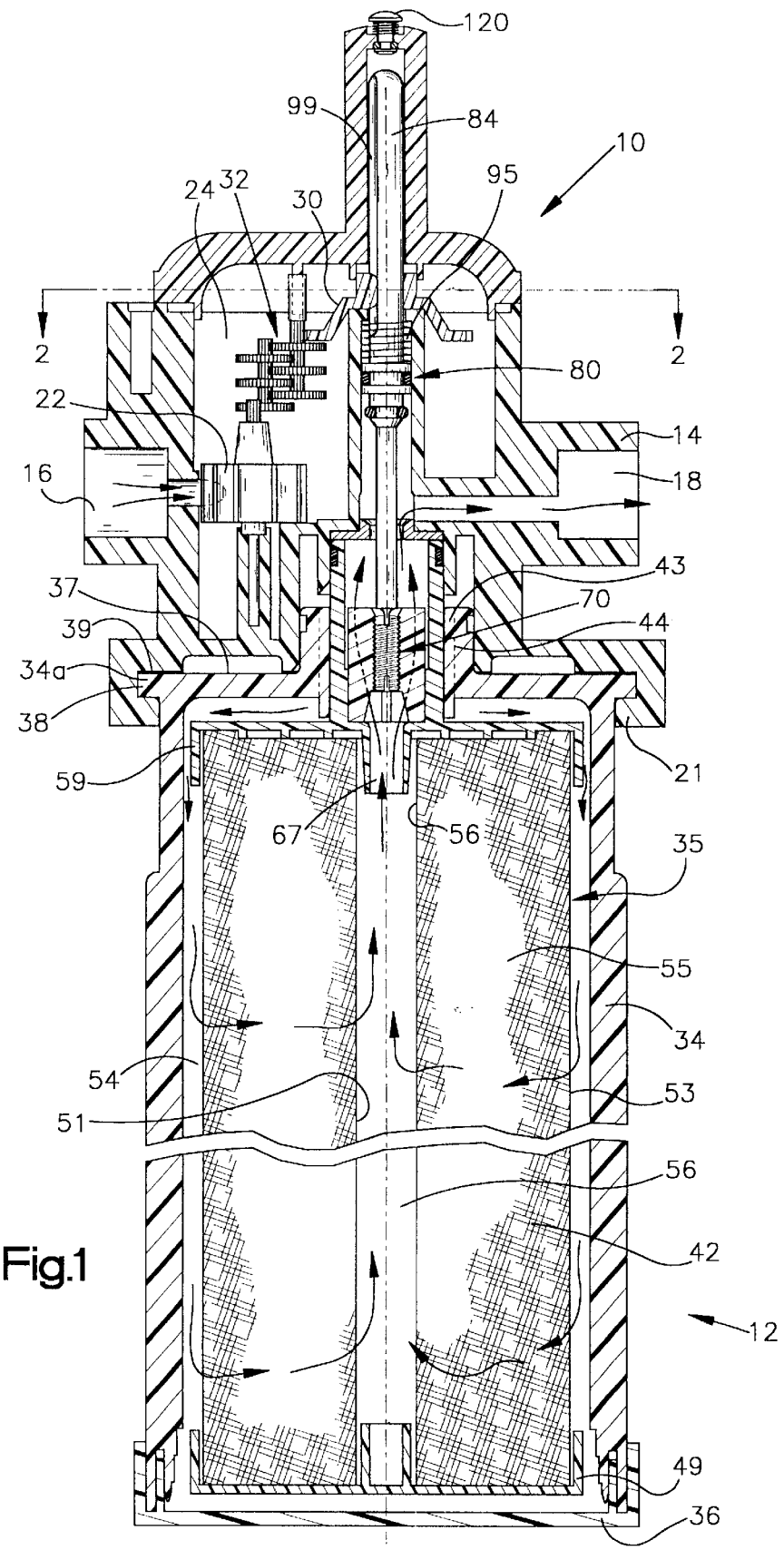
FIG. 1 is a sectional view of a filtering apparatus constructed in accordance with the preferred embodiment of the invention.

FIG. 1 illustrates the overall construction of a filtering apparatus constructed in accordance with the preferred embodiment of the invention. The apparatus includes a fluid monitoring head 10 and a filter cartridge assembly 12 removably attached to the head. In the disclosed embodiment, the head includes a molded housing 14 defining integral inlet and outlet fittings 16, 18. Each fitting is adapted to receive a fluid coupling (not shown). A segmented annular flange 21 depends downwardly from the bottom of the housing 14 (shown in phantom in FIG. 2).

Although various monitoring arrangements can be employed, in the exemplary embodiment a turbine system is utilized. In particular, a rotatable turbine 22 is rotatably mounted in a fluid receiving chamber 24. The blades of the turbine as seen best in FIG. 2, are positioned so that inlet fluid entering the receiving chamber 24 by way of an inlet nozzle 26 impinges on the blades causing attendant rotation. Rotation of the turbine is transferred to a driver member 30 through a reduction gear train indicated generally by the reference character 32.

In the disclosed embodiment, the filter cartridge assembly 12 includes an external, molded housing 34 that supports and encloses a filter element 35. An upper section of the housing 34 defines a segmented flange-like structure 34a and has an upper surface 37 for engaging the fluid monitoring head 10. A lower cap 36 is permanently installed to the housing 34 after the element 35 is inserted during assembly. A matching internal breech lock 38 is molded in the segmented flange 21 of the monitoring head 10. Within the region defined by the segmented flange 21 is a surface 39 for engaging the filter cartridge assembly 10. The segments of the flanges 34a, 21 are configured so that the segments of flange 34a can be inserted between the segments of flange 21 when the filter cartridge assembly 12 is installed on the monitoring head 10. During installation, the filter cartridge assembly 12 is oriented so that the segments of its flange 34a can move between the segments of the flange 21 of the monitoring head 10. The filter cartridge assembly 10 is moved into contact with the fluid monitoring head 10 such that surfaces 37, 39 are in sealing engagement and then rotated with respect to the monitoring head so that the segments of the flange 34a are retained within the internal breech lock 38 of the segments of the flange 21.

The filter element 35 defines a generally cylindrical shape having an inner surface 51, an outer surface 53, and a relatively thick filtering portion 55 which can consist of activated carbon or other suitable filtering material. The element 35 is located within the housing 34 by a lower filter support member 49 an upper filter cap 59. An outer channel region 54 is located between the outer surface 53 of the filter element and the housing 34 and an inner channel 56 is defined by the inner surface 51. The support members enclose a top portion and a bottom portion of the filter element 35, leaving the majority of the outer surface 53 exposed to the flow of fluid from the outer channel 54 through the filter element 55 into the inner channel 56 as indicated by the arrows in FIG. 1.

Fluid, i.e., water enters the filter cartridge assembly 12 through a plurality of cartridge inlets 105 (shown in FIG. 3) which are part of the cartridge assembly. The fluid flows around the upper filter cap 59 an into the outer channel region 54. The fluid then flows through the carbon filter 55 where the fluid is cleansed of unwanted substances. By directing the flow from the outside of the filter 55 to the inside the present invention experiences a relatively low pressure drop which allows for greater water flow for the end user. In addition, the direction of flow puts the filter in compression which decreases the potential for the filter to split when experiencing a high pressure drop due to heavy particle loading. The filtered fluid flows into the inner channel 56 and toward the upper filter cap. A plurality of fluid outlets 110 (FIG. 4) are formed in a threaded element 64 to define the outlets through which the fluid flows from the cartridge 12 into the monitoring head 10. A piston seat plate 66 is disposed at the top of the upper filter cap 59 and has an opening 67 through which the liquid flows into a piston chamber 90.

Still referring to FIG. 3, the piston chamber 90 is defined within the fluid monitoring head 10. A piston assembly 80 is slidably and rotatably retained within the chamber 90. The piston assembly 80 comprises generally an elongated stem having a tapered segment 81 and a life indicating end 84. Disposed between these ends is a piston 82. The piston 82 has valve engaging structure 83 and a guide structure 86. The valve engaging structure comprises a conically shaped surface configured to match up with the valve surface 75 of the upper filter cap 59 to block the flow of fluid out of the filter cartridge assembly 12. An o-ring 87 is seated on the valve engaging structure 83 to enhance the seal between the conically shaped surface and the valve surface 75. The guide structure 86 comprises a pair of spaced annular flanges 89 which retain an O-ring 88 between them. A biasing spring 95 is supported between the upper flange 89 and the driver member 30 which in this embodiment is a gear driven by the gear set 32. During the filter life, the biasing spring 95 urges the piston 82 toward the valve surface 75 while a threaded pin 70 acts as a keeper or hold off element and prevents the piston 82 from contacting the valve surface 75. The driver gear 30 is prevented from rotation relative to the piston assembly 80 by its interior tab 97 which is retained in a slot 99 located in the life indicating end 84. A window (not shown) in the monitoring head allows the user to view the position of the life indicating end 84 in the piston chamber 90 to determine the amount of filtering life left in the filter cartridge assembly 12.

The tapered end 81 comprises a pin engaging taper 85 at its end. The taper 85 drivably engages a pin head 71 of the hold off/keeper element. During filter operation, fluid flows into the monitoring head 10 as shown in FIG. 1, rotating the turbine 22. The turbine drives the gear set 32 which in turn drives the driver gear 30 and piston assembly 80. As the piston assembly is rotated by the driver gear, the taper 85 turns the pin 70 and threads it in downwardly a direction away from the monitoring head 10. The position of the threaded pin 70 within the threaded cavity of the element 64 determines the position of the piston assembly 80 within the piston chamber 90. As the threaded pin 70 is moved downwardly, the piston 82 moves toward the valve surface 75. Due to the distance between the conical surface of the valve engaging structure 83 and the valve surface 75, the flow of fluid is not diminished during filter operation.

Figure 5:
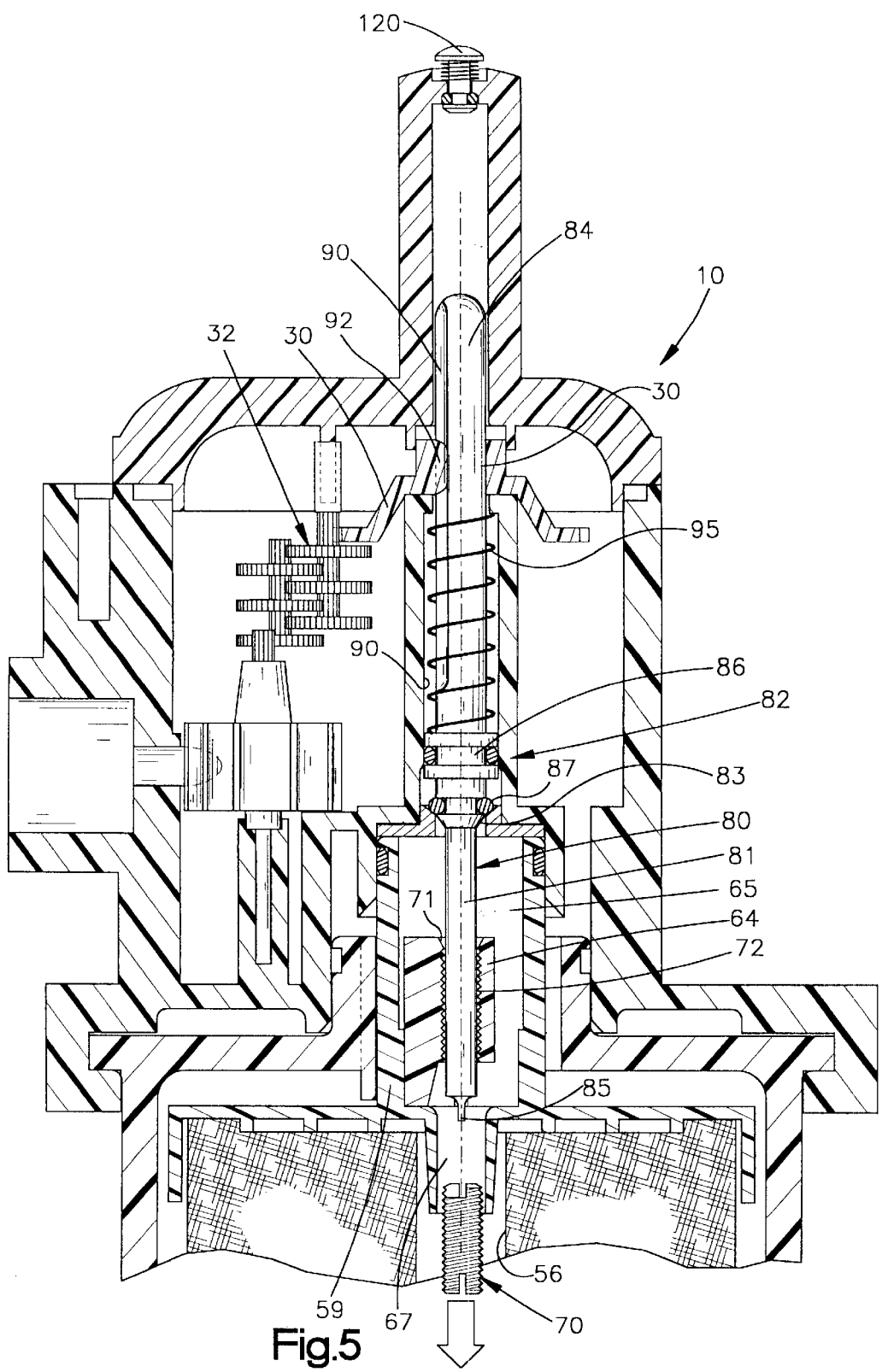
FIG. 5 is an enlarged fragmentary view of the apparatus shown in FIG. 1 in a fluid flow interrupting mode.

When the predetermined amount of fluid has been filtered, the threaded pin 70 reaches the end of the threaded cavity of the element 64 and is no longer retained therein (see FIG. 5). When the pin 70 is no longer retained in the threaded cavity of the element 64, the biasing spring 95 forces the conical surface of the valve engaging structure 83 into contact with the valve surface 75. The biasing spring 95 is assisted in forcing the valve engaging structure 83 into the valve surface 74 by a resultant force caused by ambient water pressure acting on the surfaces 80, 81 of the piston 82 (see FIG. 6). The area denoted A1 is larger than the area denoted A2, therefore the equal water pressure exerted on each surface creates a resultant force in the downward direction which acts along with the spring to engage the surface 80 with the surface 75 and tends to maintain that engagement. The resultant force tending to close the valve allows for a lighter weight spring 95 to be used. The interaction between the valve engaging structure with o-ring 87 and the valve surface 75 blocks the flow of fluid from the filter cartridge assembly 12 and thereby discontinues the flow: of water out of the monitoring head to the user.

Once the filter has stopped producing water, the user may install a new filter cartridge assembly 12 by shutting of the water supply to the filter, removing the old cartridge and fitting a new cartridge to the monitoring head 10. The threaded pin 70 features a head 71 configured to prevent manual rotation of the pin in the direction which could extend use of the filter beyond its design limit. A pressure relief valve 120 (see FIG. 1) relieves residual in the monitoring head after the water is shut off thereby facilitating cartridge removal. When the new cartridge is installed, the threaded pin 70 which is located in its initial position pushes the piston assembly 80 against the force of the biasing spring 95 to its initial position shown in FIG. 3. As the fluid flows, the piston assembly 80 will rotate until the taper 85 engages the pin head 71, usually within a half rotation of the piston assembly.

Although the invention has been described with a certain degree of particularity, it should be understood that various changes can be made to those skilled in the art without departing from the spirit or scope of the invention as hereinafter claimed.

We claim:
1. A filter apparatus comprising:
  (a) a fluid monitoring assembly defining an inlet for receiving fluid under pressure;
  (b) a replaceable filter element removably connected to said fluid monitoring assembly and defining a flow path from said inlet to an outlet and further including filtering material for filtering fluid conveyed along said flow path;
  (c) said fluid monitoring assembly including sensing means responsive to fluid flow into said filter element and operative to provide a signal indicative of the quantity of fluid received at said inlet and delivered to said replaceable filter element;
  (d) a valve member forming part of said fluid monitoring assembly and movable from a first position in which fluid flow is allowed to flow along said flow path substantially unimpeded and a second position at which fluid flow along said flow path is blocked by said valve member;
  (e) a valve actuating means responsive to said sensing means and operative to cause said valve member to move from said first to said second position upon receiving a predetermined signal from said fluid monitoring assembly; and
  (f) means for releasably coupling said valve actuating means with said valve member.

2. The apparatus of claim 1 wherein said valve actuating means opposes a biasing force on said valve member tending to urge it towards the fluid flow interrupting position and which is operative to release said valve member upon receiving said predetermined signal from said fluid monitoring assembly.

3. The apparatus of claim 2 wherein said biasing force is comprised of a resultant force caused by ambient fluid pressure operating on said valve member.

4. The apparatus of claim 1 further comprising a pressure relief means in said fluid monitoring assembly.

5. The apparatus of claim 1 further comprising a filter life indicator responsive to said sensing means for displaying a signal correlating to the relative amount of filter life remaining.

6. The apparatus: of claim 5 wherein said filter life indicator forms part of said valve member and is viewable through a window on said monitoring assembly.

7. An improved carbon filter, comprising:
(a) a fluid monitoring head defining an inlet for receiving fluid to be filtered and an outlet for discharging filtered fluid;
(b) a turbine and associated drive train forming part of said monitoring head and operative to produce an output rotation in response to fluid flow into said monitoring head, said drive train including an output drive member;
(c) a filter cartridge removably connected to said monitoring head and including structure defining a fluid flow path through said cartridge communicating with said inlet and an outlet in said monitoring head;
(d) a valve member forming part of said fluid monitoring head shiftable from a first position at which said element is substantially out of said fluid flow path and a flow interrupting position at which said element blocks flow along said flow path;
(e) a valve hold off member forming part of said filter cartridge for maintaining said valve member at said first position, said valve hold off member operative to release said valve member upon a predetermined output from said fluid monitoring head.

8. The apparatus of claim 7 wherein said valve hold off member releases said valve element in response to a predetermined number of revolutions of said output drive member.

9. The apparatus of claim 8 wherein said valve hold off member threadedly engages said filter cartridge such that the rotation of said output drive member causes said valve hold off member to unthread itself from said filter cartridge whereby said valve element is released and allowed to shift to the flow interrupting position.

10. The apparatus of claim 9 further including a releasable coupling by which said output drive member drivingly engages said valve hold off member when said cartridge is installed on said monitoring head.

11. The apparatus of claim 10 wherein said output drive member includes a stem having a tapered end and said valve hold off member includes a threaded generally cylindrical hold off member body for engaging said filter cartridge, said valve hold off member having a slotted end for engaging said tapered end of said stem, said tapered end engaging said slotted end when said filter cartridge is installed on said monitoring head.

12. The apparatus of claim 9 wherein said valve member is a piston like structure located in a valve chamber defined at least in part by said monitoring head.

13. The apparatus of claim 12 wherein said valve chamber includes a means communicating with a fluid flow chamber formed in said filter cartridge.

14. The apparatus of claim 9 wherein said filter cartridge includes a fluid outlet opening configured to sealingly engage said valve member to inhibit flow of fluid when said valve hold off member allows said valve member to move to said flow interrupting position.

15. The apparatus of claim 7 further comprising a filter life indicator responsive to said output rotation.

16. The apparatus of claim 15 wherein said filter life indicator forms part of said valve member and is viewable through a window in said fluid monitoring head.

17. The apparatus of claim 8 wherein said valve member is moved to said first position by said valve hold off member when said cartridge is installed on said fluid monitoring head.

18. A method for filtering fluid, comprising the steps of:
(a) providing fluid monitoring head in communication with a source of fluid to be filtered;
(b) removably attaching a filter element to said head;
(c) monitoring the quantity of fluid conveyed through said filter by a sensing means responsive to fluid flow to said filter element;
(d) terminating fluid flow through said filter by blocking a fluid flow path defined by said monitoring head with a blocking means responsive to said sensing means and forming part of said monitoring head when a predetermined quantity of fluid has been conveyed through said filter as measured by said monitoring head.

19. A filter apparatus comprising:
(a) a fluid monitoring assembly defining an inlet for receiving fluid and operative to provide a signal indicative of the amount of fluid received at said inlet;
(b) a replaceable filter element removably connected to said fluid monitoring assembly, said filter including material for filtering fluid conveyed through said filter element;
(c) a valve member forming part of said monitoring assembly, said member movable from a first position at which fluid flow is allowed to flow through said filter element substantially unimpeded and a second position at which fluid flow through said filter element is blocked by said valve member;
(d) a valve actuating means forming part of said filter element responsive to said signal provided by said fluid monitoring assembly and operative to cause said valve member to move from said first to said second position upon receiving a signal indicating that a predetermined quantity of fluid has been treated by said filter element as measured by said fluid monitoring assembly.

20. The apparatus of claim 19 wherein said valve actuating means causes said valve member to move from said first position towards said second position in response to a signal from said fluid monitoring assembly indicating that fluid is flowing through said filter element.

21. The apparatus of claim 19 wherein said valve actuating means includes a first threaded structure engageable with a second threaded structure forming part of said filter element, said first and second threaded structures threadedly engaging when said valve member is it said first position and said structures being disengaged when said valve member is at said second position.

22. The apparatus of claim 19 wherein said valve actuating means resets said valve member from said second position to said first position when said filter element is connected to said fluid monitoring assembly.

23. An improved carbon filter, comprising:
(a) a fluid monitoring head defining an inlet for receiving fluid to be filtered and an outlet for discharging filter fluid;
(b) said fluid monitoring head including a fluid flow sensing mechanism including an output drive member rotatable in response to fluid flow between said inlet and said monitoring head;
(c) a filter cartridge removably connected to said monitoring head and including structure defining a fluid flow path through said cartridge communicating with said inlet and an outlet in said monitoring head;
(d) a valve member forming part of said monitoring head, shiftable from a first position at which said member is substantially out of said fluid flow path and a flow interrupting position at which said member inhibits flow along said flow path;

(e) a valve hold off member forming part of said filter cartridge for maintaining said valve member at said first position, said valve hold off member operative to release said valve member upon a predetermined number of rotations of said output drive member.

24. The apparatus of claim 23 wherein said mechanism comprises a turbine and associated drive train, said turbine disposed in a flow path such that fluid flow in said monitoring head produces attended rotation in said turbine.

25. An improved carbon filter assembly, comprising:

(a) a fluid monitoring head defining an inlet for receiving fluid to be filtered and an outlet for discharging filtered fluid;

(b) a turbine and associated drive train forming part of said monitoring head and operative to produce an output rotation in response to fluid flow into said monitoring head, said drive train including an output drive member;

(c) a filter element forming part of said assembly and including structure defining a fluid flow path through said filter element communicating with said inlet and outlet in said monitoring head;

(d) a valve member forming part of said monitoring head shiftable from a first position at which said member is substantially out of said fluid flow path and a flow interrupting position at which said member blocks flow along said flow path;

(e) a valve hold off member forming part of said filter element for maintaining said valve member at said first position, said valve hold off member operative to release said valve member upon a predetermined output from said fluid monitoring head.

26. The carbon filter assembly of claim 25 wherein:

(a) said filter element includes filter material having a first surface with a relatively large surface area and a second surface having a relatively small surface area; and (b) said fluid path defining structure routes said fluid such that said fluid enters said filtering material through said first surface area and said fluid exits said filter material through said second surface.

27. The carbon filter assembly of claim 26 wherein said filter material has a generally cylindrical shape and wherein said first surface is the exterior surface of said cylindrical shape and said second surface is the interior surface of said cylindrical shape.

28. The carbon filter assembly of claim 25 wherein said valve member is configured such that ambient water pressure within said filter assembly exerts a force on said valve member urging it to said flow interrupting position.

29. The carbon filter assembly of claim 25 comprising a pressure relief means in said fluid monitoring head.

30. A replaceable filter element for a filter apparatus wherein said apparatus comprises a fluid monitoring assembly defining an inlet for receiving fluid under pressure and including a sensing means responsive to fluid flow into said replaceable filter element and operative to provide a signal indicative of the quantity of fluid received at said inlet and delivered to said replaceable filter element, a valve member forming part of said fluid monitoring assembly and movable from a first position in which fluid is allowed to flow along said flow path substantially unimpeded and a second position at which fluid flow along said flow path is blocked by said valve member, said replaceable filter element removeably connected to said fluid monitoring assembly and defining a flow path from said inlet to an outlet and comprising:

a) filtering material for filtering fluid conveyed along said flow path;

b) a valve actuating means responsive to said sensing means and operative to cause said valve member to move within said fluid monitoring assembly from said first position to said second position upon receiving a predetermined signal from said fluid monitoring assembly; and c) means for releasably coupling said valve actuating means with said valve member.

31. The replaceable filter element of claim 30 wherein said valve actuating means opposes a biasing force on said valve member tending to urge it towards said second position and which is operative to release said valve member upon receiving said predetermined signal from said fluid monitoring assembly.

32. The replaceable filter element of claim 30 wherein said valve actuating means comprises a threaded member threadably retained in a threaded cavity, said threaded member unthreading from said threaded cavity in response to said signal indicative of said fluid flow through said filter element and separating from said threaded cavity when said predetermined signal is received thereby allowing said biasing force to move said valve member to said second position in which fluid flow is substantially impeded.

33. The replaceable filter element of claim 30 wherein said valve member includes a stem having a tapered end and said valve actuating member includes a threaded generally cylindrical hold off member body for engaging said filter element, said valve actuating member having a slotted end for engaging said tapered end of said stem, said tapered end engaging said slotted end when said filter element is installed on said monitoring head.

* * * * *